(12) United States Patent
King

(10) Patent No.: US 7,287,798 B2
(45) Date of Patent: Oct. 30, 2007

(54) TAILGATE ASSEMBLY AND METHOD OF OPERATING THE SAME

(75) Inventor: E. Mackey King, Howell, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 99 days.

(21) Appl. No.: 11/084,489

(22) Filed: Mar. 18, 2005

(65) Prior Publication Data

US 2006/0208519 A1 Sep. 21, 2006

(51) Int. Cl.
*B60R 11/06* (2006.01)
(52) U.S. Cl. ............... 296/57.1; 296/26.11; 296/180.1
(58) Field of Classification Search ............ 296/57.1, 296/26.08, 26.04, 26.02, 26.09, 26.11, 180.1, 296/50, 180.2, 26.05; 362/503, 544, 800
See application file for complete search history.

(56) References Cited

U.S. PATENT DOCUMENTS

| | | | | |
|---|---|---|---|---|
| 4,174,863 A * | 11/1979 | Gotz | ................... | 296/180.5 |
| 4,472,639 A * | 9/1984 | Bianchi | ................... | 296/26.11 |
| 4,863,213 A * | 9/1989 | Deaver et al. | ................... | 296/180.1 |
| 5,074,612 A * | 12/1991 | Liese et al. | ................... | 296/180.5 |
| 5,141,281 A * | 8/1992 | Eger et al. | ................... | 296/180.5 |
| 5,165,751 A * | 11/1992 | Matsumoto et al. | ................... | 296/180.5 |
| 5,236,242 A * | 8/1993 | Seeman | ................... | 296/180.1 |
| 5,468,038 A * | 11/1995 | Sauri | ................... | 296/57.1 |
| 5,655,809 A * | 8/1997 | Hutchinson | ................... | 296/100.03 |
| 5,688,020 A * | 11/1997 | Burg | ................... | 296/180.1 |
| 5,732,995 A * | 3/1998 | Piccariello | ................... | 296/57.1 |
| 5,775,759 A * | 7/1998 | Cummins | ................... | 296/26.11 |
| 5,788,311 A * | 8/1998 | Tibbals | ................... | 296/62 |
| 5,816,638 A * | 10/1998 | Pool, III | ................... | 296/26.11 |
| 5,902,000 A * | 5/1999 | Wold | ................... | 296/26.11 |
| 5,975,608 A * | 11/1999 | Jarman | ................... | 296/26.11 |
| 6,019,410 A * | 2/2000 | Trostle et al. | ................... | 296/26.11 |
| 6,082,801 A * | 7/2000 | Owen et al. | ................... | 296/26.11 |
| 6,170,904 B1 * | 1/2001 | Schaedlich et al. | ................... | 296/180.1 |
| 6,364,392 B1 * | 4/2002 | Meinke | ................... | 296/62 |
| 6,378,926 B1 * | 4/2002 | Renze et al. | ................... | 296/26.11 |
| 6,431,639 B2 * | 8/2002 | Yoon | ................... | 296/180.1 |
| 6,447,050 B1 * | 9/2002 | Plassmeyer et al. | ................... | 296/180.5 |
| 6,454,338 B1 * | 9/2002 | Glickman et al. | ................... | 296/57.1 |
| 6,550,841 B1 * | 4/2003 | Burdon et al. | ................... | 296/57.1 |
| 6,565,145 B2 * | 5/2003 | Pettey | ................... | 296/180.5 |
| 6,698,810 B1 * | 3/2004 | Lane | ................... | 296/3 |
| 6,712,423 B2 * | 3/2004 | Lehmann | ................... | 296/180.1 |
| 6,712,424 B2 * | 3/2004 | Swain | ................... | 296/180.1 |
| 6,805,399 B1 * | 10/2004 | Brown et al. | ................... | 296/180.5 |
| 6,814,395 B1 * | 11/2004 | Lin | ................... | 296/180.1 |
| 6,908,134 B1 * | 6/2005 | Summers | ................... | 296/26.11 |

(Continued)

*Primary Examiner*—Kiran B. Patel
(74) *Attorney, Agent, or Firm*—Ralph E. Smith

(57) ABSTRACT

A tailgate assembly and method of operating the same. The assembly includes a door portion movable between a closed position and an open position. An extendable spoiler is operably attached to the door portion. An extendable floorbed is operably attached to the door portion. The floorbed may be extended when the door portion is in the open position and the spoiler is extended. The method includes moving a door portion between a closed position and an open position. A spoiler operably attached to the door portion is extended. A floorbed operably attached to the door portion is extended when the door portion is in the open position and the spoiler is extended.

19 Claims, 6 Drawing Sheets

U.S. PATENT DOCUMENTS

| | | | |
|---|---|---|---|
| 6,913,305 B1* | 7/2005 | Kern et al. | 296/51 |
| 6,966,595 B2* | 11/2005 | Bruford et al. | 296/57.1 |
| 6,988,756 B1* | 1/2006 | Meinke et al. | 296/50 |
| 6,991,277 B1* | 1/2006 | Esler | 296/50 |
| 7,021,689 B1* | 4/2006 | Weisbeck, III | 296/26.11 |
| 2002/0006317 A1* | 1/2002 | Hofmann et al. | 410/96 |
| 2003/0000980 A1* | 1/2003 | Muizelaar et al. | 224/404 |
| 2005/0110293 A1* | 5/2005 | Tan et al. | 296/26.09 |
| 2005/0117991 A1* | 6/2005 | Anderson et al. | 410/104 |
| 2005/0161964 A1* | 7/2005 | Adleman | 296/26.09 |
| 2005/0168013 A1* | 8/2005 | Rinklin | 296/180.1 |
| 2006/0145505 A1* | 7/2006 | Masterton | 296/57.1 |

* cited by examiner

TAILGATE ASSEMBLY AND METHOD OF OPERATING THE SAME

TECHNICAL FIELD OF THE INVENTION

The present invention relates generally to tailgate assemblies for vehicles. More particularly, the invention relates to a tailgate assembly including an air spoiler and method of operating the same.

BACKGROUND OF THE INVENTION

An automobile (e.g., a car, truck, etc.) may include a spoiler 100 fixed to a rear portion of a vehicle 110, such as a trunk 120, by means of one or more support stands 130 as shown in FIG. 1. A spoiler adopted in automobile aeromechanics operates with the same fundamental principles as those of aerofoils of airplanes. A distinction between the two is that the airplane aerofoil produces an upward lift, whereas the automobile spoiler of an automobile produces a downward force along arrow A. As the vehicle 110 travels in a left to right direction, air flows to the left, along arrow B, and splits both above, along arrow C, and below, along arrow D, the spoiler 100. Since the air flows a longer distance below the spoiler 100 than above, it travels at a faster rate to meet up with the air from which it was split. This produces a differential in air pressure thereby resulting in the downward force, also known as a downforce. The downforce is proportional to the speed of the vehicle 110 and is helpful in improving tire traction and handling of the vehicle 110. Beside improving tire traction and handling, the spoiler 100 may enhance the aesthetics of the vehicle 110. It would further be desirable if the spoiler 100 would provide additional function(s) other than those described.

Automobiles, such as trucks, may include a rear-bed portion that may be useful for hauling cargo. In many instances, the cargo may be insecure and thus be dislodged from the rear-bed should, for example, the truck hit a bump. Thus, it would be desirable to provide a strategy for securing cargo in the rear-bed portion of the vehicle.

Another limitation of current rear-bed portions of vehicles relates to space limitations. For example, the amount of cargo capable of being hauled is limited to the actual dimensions of the rear-bed. In some instances, a tailgate of the rear-bed may be folded downward to provide additional cargo space. However, it would be desirable to provide a strategy for increasing the rear-bed size even further. Therefore, it would be desirable to provide a tailgate assembly and method of operating the same that overcomes the aforementioned and other disadvantages.

SUMMARY OF THE INVENTION

One aspect of the present invention provides a tailgate assembly. The assembly includes a door portion movable between a closed position and an open position. An extendable spoiler and an extendable floorbed are operably attached to the door portion. The floorbed may be extended when the door portion is in the open position and the spoiler is extended.

Another aspect of the invention provides a method of operating a tailgate assembly. The method includes moving a door portion between a closed position and an open position, extending a spoiler operably attached to the door portion and extending a floorbed operably attached to the door portion when the door portion is in the open position and the spoiler is extended.

Another aspect of the invention provides a tailgate assembly. The assembly includes means for moving a door portion between a closed position and an open position, and means for extending a spoiler operably attached to the door portion. The assembly further includes means for extending a floorbed operably attached to the door portion when the door portion is in the open position and the spoiler is extended.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
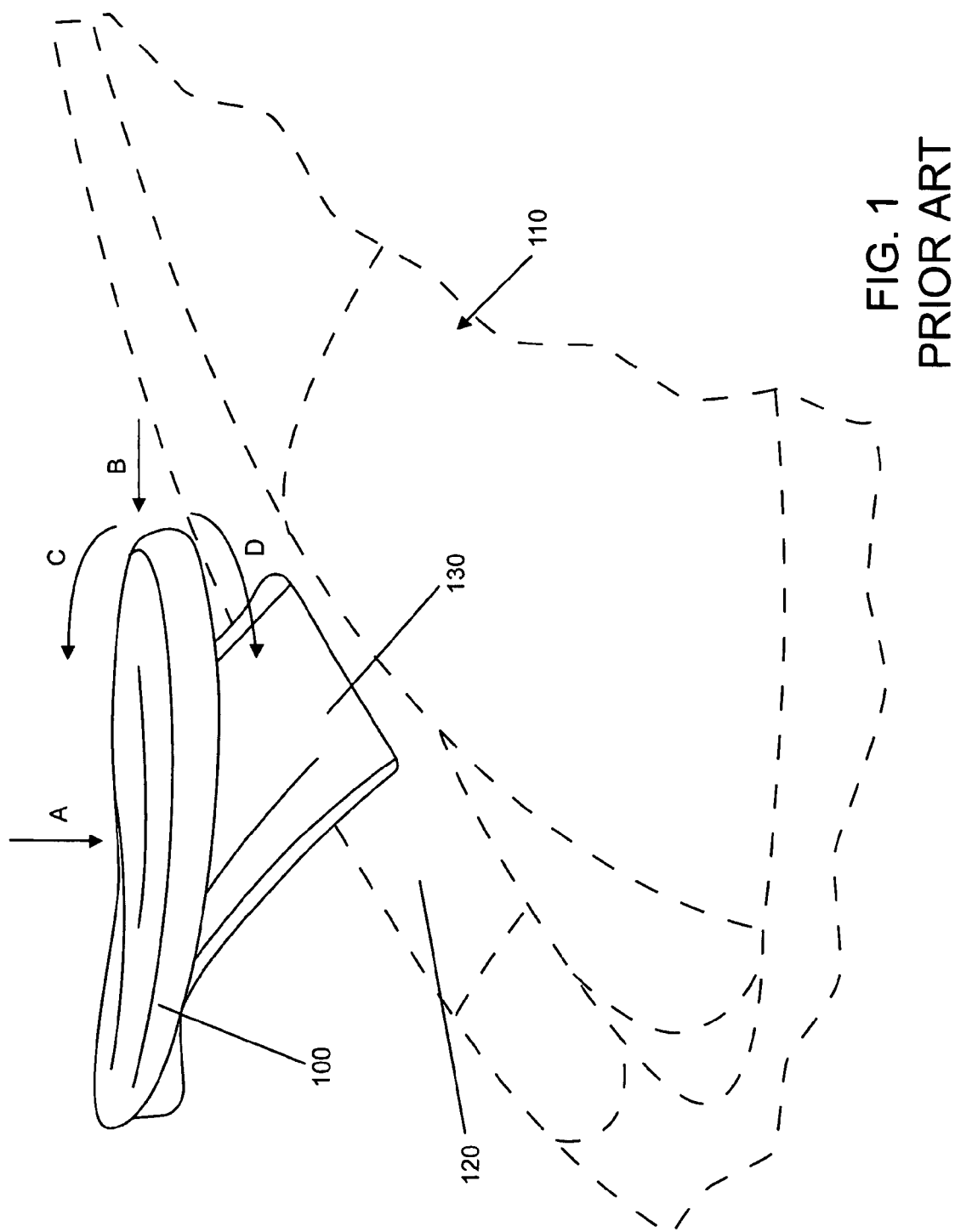
FIG. 1 is a view of a prior art spoiler operably attached to a rear portion of an automobile.
Figure 2:
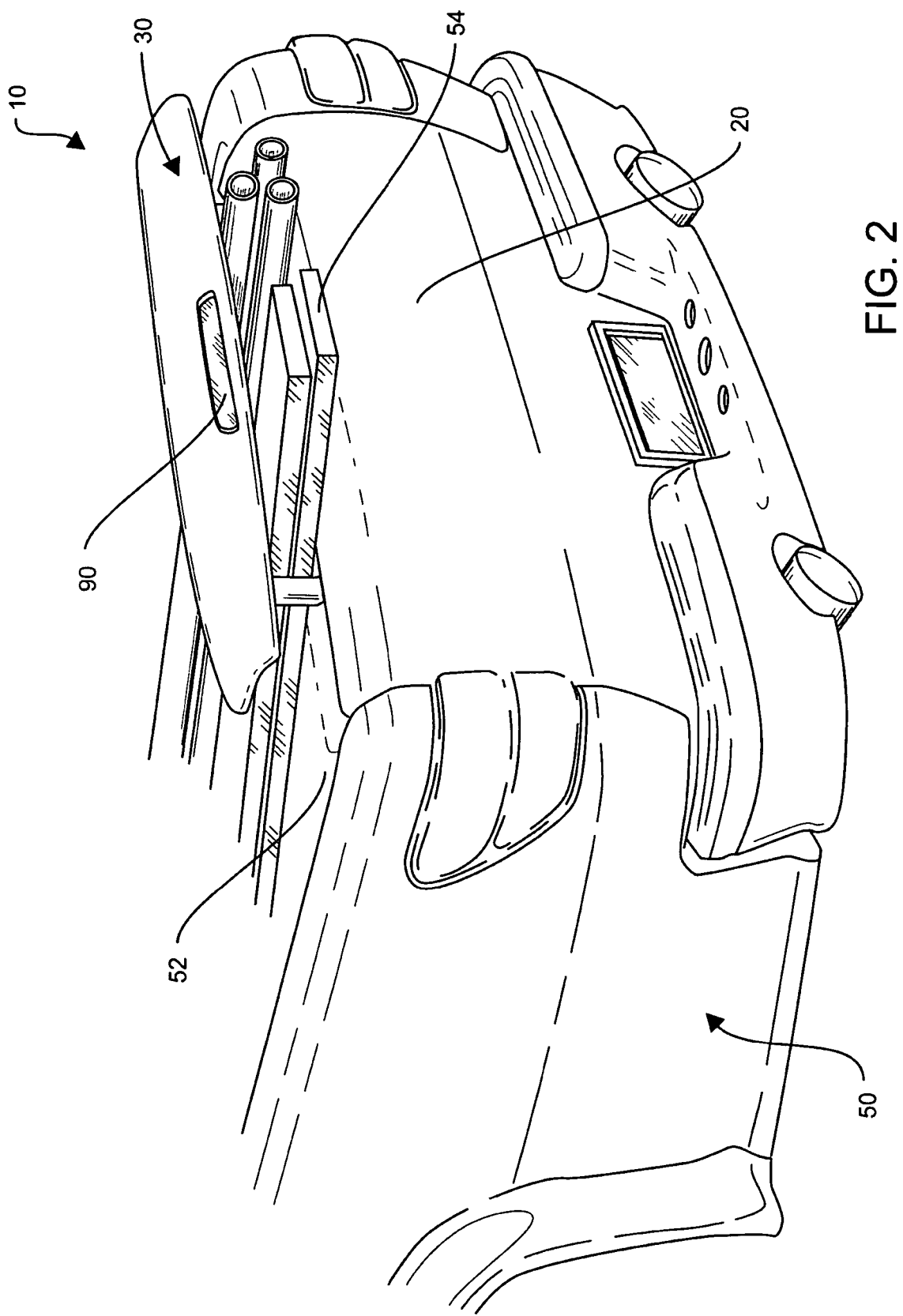
FIG. 2 is a perspective view of a tailgate assembly in accordance with a first embodiment of the present invention wherein cargo is positioned between a door portion, shown in a closed position, and an extendable spoiler.
Figure 3:
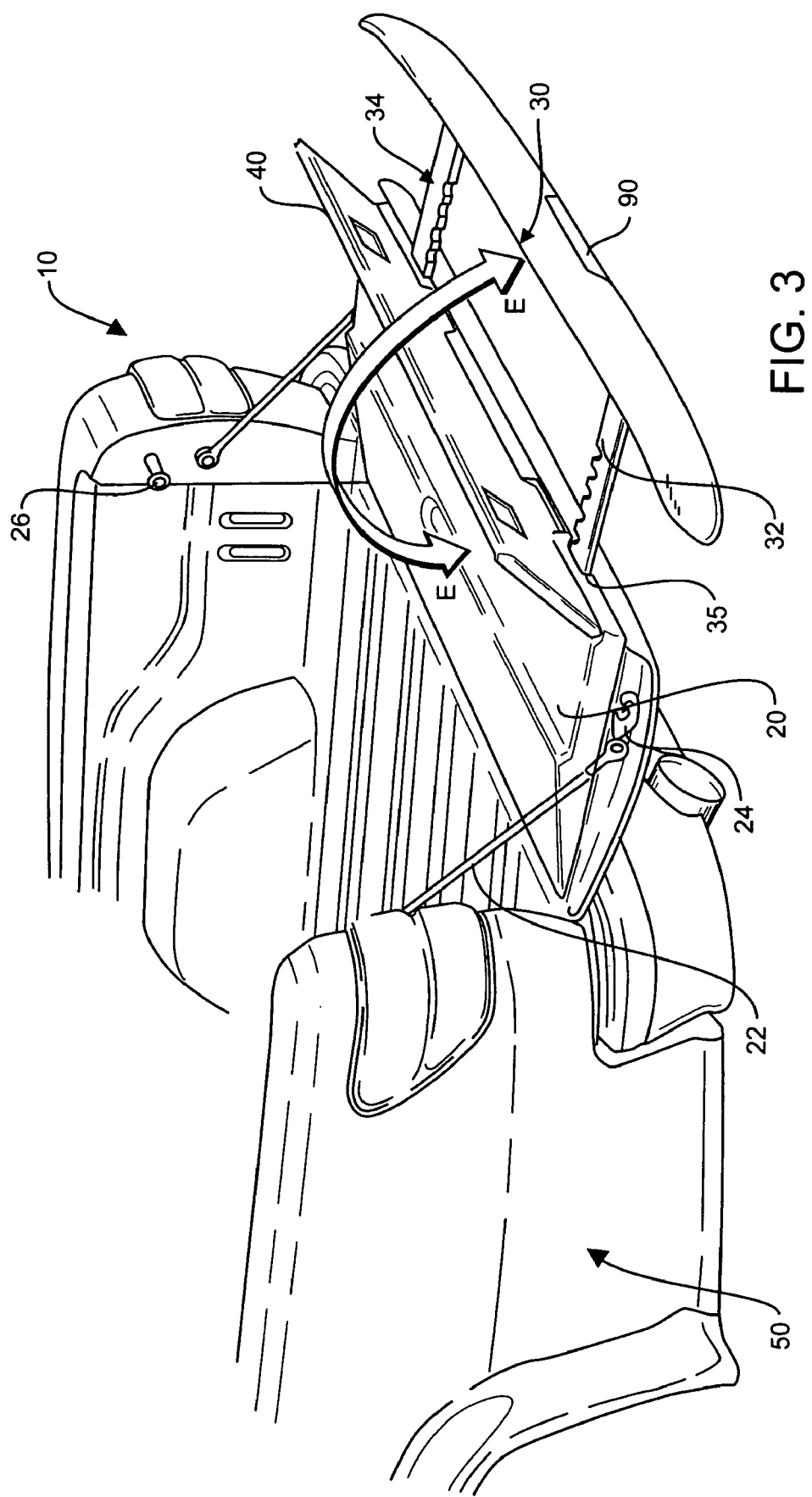
FIG. 3 is a perspective view of the tailgate assembly shown in FIG. 2 wherein the door portion is shown in an open position, a spoiler is shown extended, and a floorbed is shown being extended.
Figure 4:
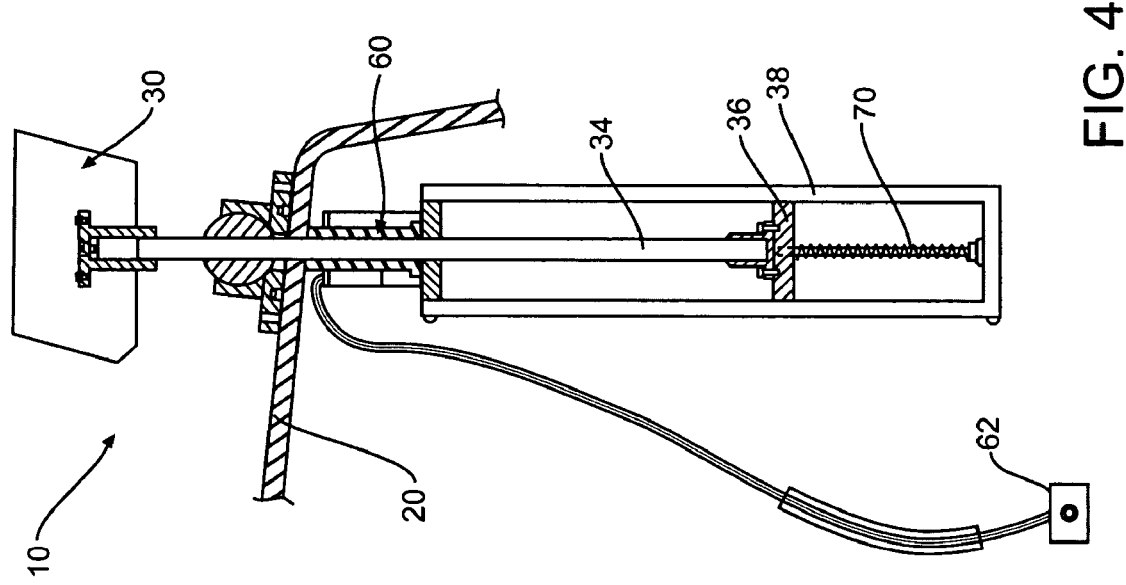
FIG. 4 is a cross-sectional view of the tailgate assembly shown in FIGS. 2 and 3 wherein the spoiler is operably attached to the door portion with a motor assembly.

Referring to the drawings, wherein like reference numerals refer to like elements, FIGS. 2, 3, and 4 are perspective views of a tailgate assembly, shown generally by numeral 10, in accordance with a first embodiment of the present invention. Assembly 10 includes a door portion 20 movable between a closed position, as shown in FIG. 2, and an open position, as shown in FIG. 3. An extendable spoiler 30 is operably attached to the door portion 20. An extendable floorbed 40 is operably attached to the door portion 20. Floorbed 40 may be extended when the door portion 20 is in the open position and the spoiler 30 is extended. Those skilled in the art will recognize that the configuration of the assembly 10 may vary from the present description and figures. The inventor contemplates that numerous variations may be made to the assembly 10 without departing from the spirit and scope of the claims.

Referring to FIG. 2, the assembly 10 may be operably attached to a vehicle 50. In a preferred embodiment, by way of example, the vehicle may be a truck. It should be appreciated by those skilled in the art that the invention is not limited to a truck alone but may be applied to other vehicles such as an automobile, airplane, marine vessel, and the like. Assembly 10 may be positioned at a rear-bed portion of the vehicle 50 thereby forming a back end of a cargo bed 52. Cargo 54 may be positioned within the cargo bed 52. Spoiler 30 may be extended to provide a cargo 54 lock. Specifically, the spoiler 30 may be extended upward providing space for the cargo 54 to be positioned therethrough. The spoiler may then be moved downward onto the cargo 54 thereby securing it. Spoiler 30 may be manufactured from one or more materials known in the art such as a composite material, metal (e.g., aluminum), and the like. Preferably, the spoiler 30 may be manufactured from an injection molded plastic thereby providing low cost, dent resistance, low weight, and easy paintability. Spoiler 30 may further include a light assembly 90 operably attached thereto to provide a brake light or other signal function.

Referring to FIG. 3, the door portion 20 may be movable to the open position as shown along arrows E. At least one and, in this case two, retainers 22 may be provided to limit the position to which the door portion 20 is opened. One or more latches 24 may be provided corresponding to pins 26 for securing the door portion 20 in the closed position. Spoiler 30 may further comprise at least one and, in this case two, support stands 34 operably attached to the spoiler 34 and slidably received within the door portion 20. Support stands 34 are received in openings 35 formed within the door portion 20. As described below, the spoiler 30 may include a ratchet portion 32 formed on support stands 34 for locking the spoiler position during automatic extension.

FIG. 4 is a cross-sectional view of the assembly 10 shown in FIGS. 2 and 3 wherein the spoiler 30 is operably attached to the door portion 20 with a motor assembly 60. Motor assembly 60 provides automatic extension of the spoiler 30 and multiple adjustment heights thereof. Motor assembly 60 may include an electronic controller 62 for controlling the automatic extension. Support stands 34 are operably attached at a first end to the spoiler 30 and at a second end to a base portion 36. Base portion 36 translates within a housing 38. Base portion 36 may further be attached to a screw 70. Motor assembly 60 rotates the screw 70 in forward or reverse directions to provide extension of the spoiler 30. Motor assembly 60 may be capable of adjusting extension of the spoiler 30 in a segmented manner within a certain range, thereby accomplishing electronically adjusting extension of the spoiler 30. Ratchet portion 32 formed on the support stands 34 provides means for locking extension of the spoiler 30 during its automatic extension. Spoiler 30 may include additional means for adjusting a tilt angle thereof relative to the vehicle. The tilt angle of the spoiler 30 may be adjusted in accordance with strategies known to those skilled in the art. In another embodiment, the extension of the spoiler 30 and/or the spoiler angle may be adjusted manually.

Figure 5:
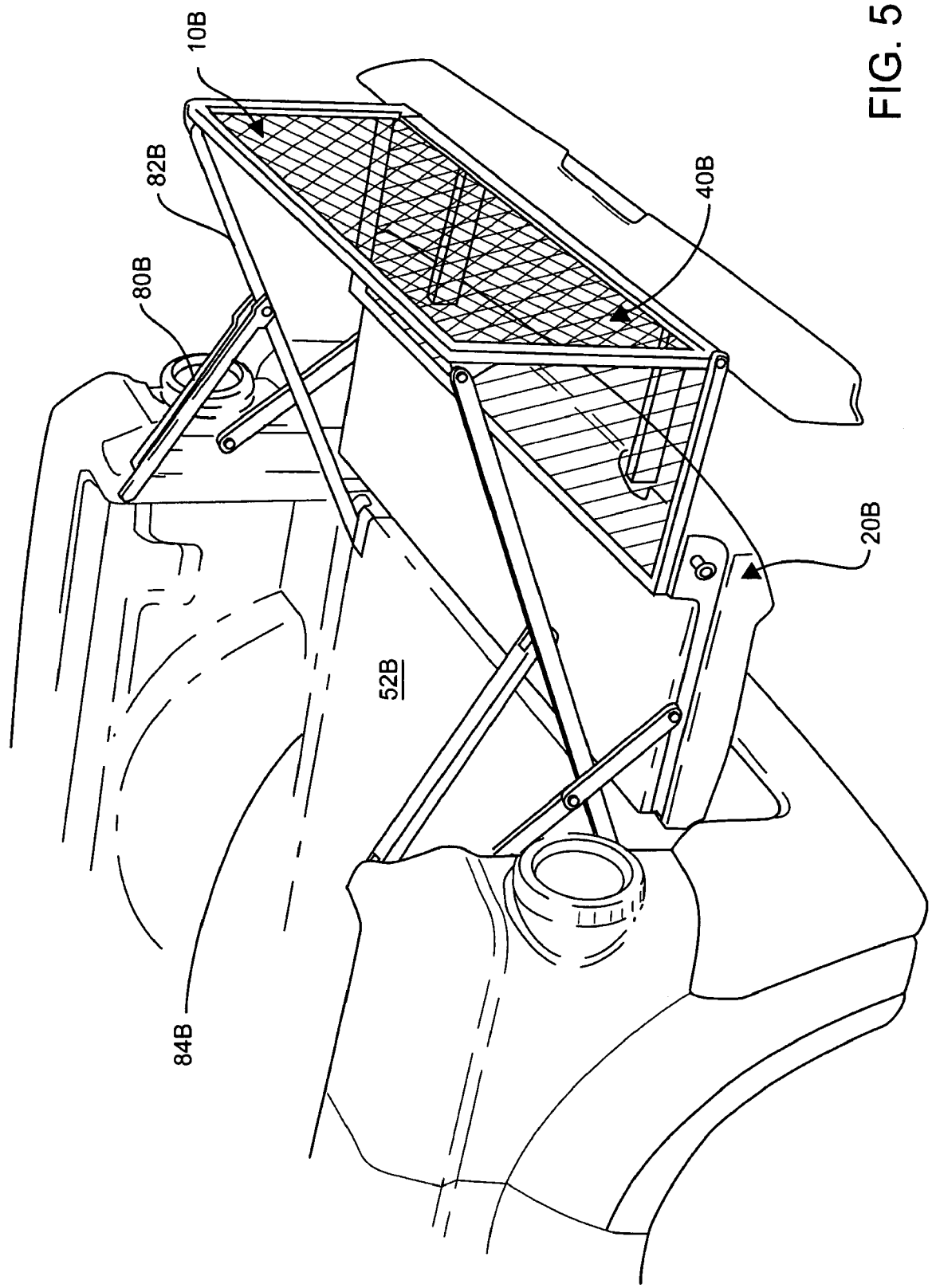
FIG. 5 is a perspective view of the tailgate assembly in accordance with a second embodiment of the present invention wherein a floorbed is operably attached to the door portion with a hinge assembly.

In a second embodiment, as shown in FIG. 5, a tailgate assembly 10*b* includes an extendable floorbed 40*b* operably attached to a door portion 20*b*. Floorbed 40*b* may be operably attached to the door portion 20*b* with a hinge assembly 80*b* or another like mechanism to provide a swinging motion of the floorbed 40*b*. Floorbed 40*b* may be manufactured from a grate-like material as shown or another material depending on the required application. Hinge assembly 80*b* may provide positioning of the floorbed 40*b* to an L-shaped position, as shown, to effectively increase the size of a vehicle cargo bed 52*b*. Hinge assembly 80*b* may include braces 82*b* that are operably attached to the tailgate assembly 10*b*. Braces 82*b* may be operably attached to the hinge assembly 80*b* and the tailgate assembly 10*b* with rotating members, such as pivots. During movement of the floorbed 40*b* between a stowed position and the L-shaped position shown, the braces 82*b* may slide along recesses 84*b* formed in the cargo bed 52*b*. To stow the floorbed 40*b*, the tailgate assembly 10*b* may fold upon itself whereby the braces 82*b* translate forward along the recesses 84*b*. When the floorbed 40*b* is stowed, the door portion 20*b* may then move between the open position shown to the closed position.

Figure 6:
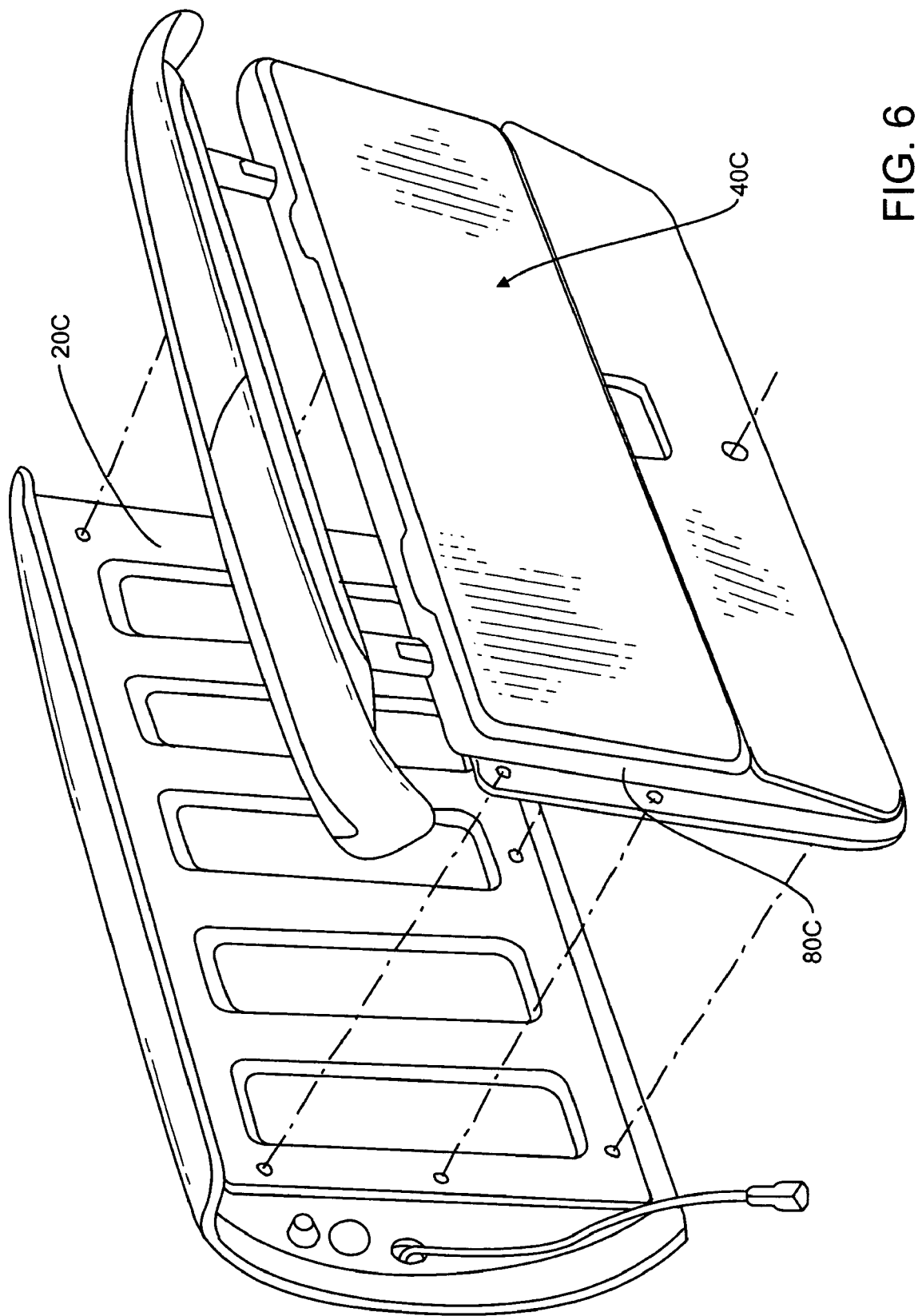
FIG. 6 is an exploded perspective view of the tailgate assembly in accordance with a third embodiment of the present invention wherein a floorbed is removably attached to a door portion.

In a third embodiment, as shown in FIG. 6, a floorbed 40*c* may be removably attached to a door portion 20*c*. Floorbed 40*c* may be removably attached with clips, pin, nuts and bolts, and the like thereby allowing post-market modification to a vehicle. The third embodiment further includes a floorbed 40*c* operably attached to the door portion 20*c* with a sliding assembly 80*c*. As such, the door portion 20*c* does not require unfolding for extension but, rather, can be slid in and out. Those skilled in the art will appreciate that the floorbed may be attached to the door portion with numerous attachment means and may be adapted for retrofitting numerous vehicles in a variety of applications.

While the embodiments of the invention disclosed herein are presently considered to be preferred, various changes and modifications can be made without departing from the spirit and scope of the invention. For example, the tailgate assembly configuration, and method of operating the same are not limited to any particular design or sequence. Specifically, the door portion, extendable spoiler, extendable floorbed, and method of operating the same may vary without limiting the utility of the invention.

Upon reading the specification and reviewing the drawings hereof, it will become immediately obvious to those skilled in the art that myriad other embodiments of the present invention are possible, and that such embodiments are contemplated and fall within the scope of the presently claimed invention. The scope of the invention is indicated in the appended claims, and all changes that come within the meaning and range of equivalents are intended to be embraced therein.

What is claimed is:

1. A tailgate assembly comprising;
   a door portion movable between a closed position and an open position;
   an extendable spoiler operably attached to the door portion; by at least one extendable support stand and
   an extendable floorbed operably attached to the door portion; wherein the floorbed may be extended to rest on the at least one support stand between an edge of the door portion and the spoiler when the door portion is in the open position and the spoiler is extended.

2. The assembly of claim 1 wherein the extendable spoiler is operably attached to the door portion with a motor assembly.

3. The assembly of claim 1 wherein the extendable spoiler comprises a cargo lock when the spoiler is extended vertically when the door portion is in the closed position, cargo extends between the spoiler and a top surface of the tailgate assembly, and the spoiler is retracted to engage the cargo.

4. The assembly of claim 1 wherein the at least one support stand includes a ratchet portion.

5. The assembly of claim 1 wherein the extendable spoiler comprises an injection molded plastic.

6. The assembly of claim 1 wherein the floorbed is operably attached to the door portion with a hinge assembly.

7. The assembly of claim 1 wherein the floorbed is operably attached to the door portion with a sliding assembly.

8. The assembly of claim 1 wherein the floorbed is removably attached to the door portion.

9. The assembly of claim 1 further comprising a light assembly operably attached to the spoiler.

10. A method of operating a tailgate assembly, the method comprising:

moving a door portion between a closed position and an open position;

extending a spoiler operably attached to the door portion by at least one extendable support stand; and extending a floorbed operably attached to the door portion, such that the floorbed rests on the at least one support stand between an edge of the door portion and the spoiler when the door portion is in the open position and the spoiler is extended.

11. The method of claim 10 wherein extending the spoiler comprises automatic extension.

12. The method of claim 10 wherein extending the spoiler comprises activating a ratcheting mechanism operably attached to the spoiler.

13. The method of claim 10 wherein the spoiler comprises an injection molded plastic.

14. The method of claim 10 wherein extending the floorbed comprises swinging the floorbed into the extended position.

15. The method of claim 10 wherein extending the floorbed comprises sliding the floorbed into the extended position.

16. The method of claim 10 further comprising removably attaching the floorbed to the door portion.

17. The method of claim 10 further comprising providing a light assembly operably attached to the spoiler.

18. A tailgate assembly comprising:

means for moving a door portion between a closed position and an open position;

means for extending a spoiler operably attached to the door portion; and means for extending a floorbed operably attached to the door portion such that an extended portion of the floorbed rests on the means for extending between an edge of the door portion and the spoiler when the door portion is in the open position and the spoiler is extended.

19. The assembly of claim 18 further comprising a light assembly operably attached to the spoiler.

* * * * *